United States Patent
Watanabe et al.

(10) Patent No.: US 9,742,242 B2
(45) Date of Patent: Aug. 22, 2017

(54) ROTARY ELECTRIC MACHINE INCLUDING A STATOR COIL END COOLING CONSTRUCTION AND ROTOR WITH DUAL FAN BLADES

(71) Applicants: Norihiro Watanabe, Chiyoda-ku (JP); Masao Morita, Chiyoda-ku (JP); Yoshihiro Miyama, Chiyoda-ku (JP); Moriyuki Hazeyama, Chiyoda-ku (JP); Hideaki Arita, Chiyoda-ku (JP)

(72) Inventors: Norihiro Watanabe, Chiyoda-ku (JP); Masao Morita, Chiyoda-ku (JP); Yoshihiro Miyama, Chiyoda-ku (JP); Moriyuki Hazeyama, Chiyoda-ku (JP); Hideaki Arita, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 252 days.

(21) Appl. No.: 14/344,833

(22) PCT Filed: Oct. 10, 2012

(86) PCT No.: PCT/JP2012/076196
§ 371 (c)(1),
(2) Date: Mar. 13, 2014

(87) PCT Pub. No.: WO2013/054811
PCT Pub. Date: Apr. 18, 2013

(65) Prior Publication Data
US 2015/0028727 A1    Jan. 29, 2015

(30) Foreign Application Priority Data

Oct. 13, 2011 (JP) .................................. 2011-225560
Jan. 31, 2012 (JP) .................................. 2012-018188

(51) Int. Cl.
H02K 1/27 (2006.01)
H02K 9/06 (2006.01)
(Continued)

(52) U.S. Cl.
CPC ............. H02K 9/06 (2013.01); H02K 1/2706 (2013.01); H02K 3/24 (2013.01); H02K 3/522 (2013.01);
(Continued)

(58) Field of Classification Search
CPC  H02K 3/522; H02K 3/24; H02K 9/08; H02K 9/10; H02K 9/12; H02K 9/14;
(Continued)

(56) References Cited

U.S. PATENT DOCUMENTS 2,074,067 A * 3/1937 Darnell .................... H02K 9/06
310/52
3,610,975 A * 10/1971 Onjanow ................. H02K 9/18
310/57
(Continued)

FOREIGN PATENT DOCUMENTS

JP     26 9711       8/1951
JP     61 129456     8/1986
(Continued)

OTHER PUBLICATIONS

EIC 2800 Search by Eileen Patton 528433 dated Nov. 17, 2016.*
(Continued)

*Primary Examiner* — Michael Andrews
*Assistant Examiner* — Maged Almawri
(74) *Attorney, Agent, or Firm* — Oblon, McClelland, Maier & Neustadt, L.L.P.

(57) ABSTRACT

In a rotary electric machine, first inclined surfaces that intersect a plane that includes a central axis of a shaft at a predetermined angle are disposed radially outside gaps
(Continued)

between coil ends of circumferentially adjacent concentrated winding coils, and cooling air that is blown out from a cooling fan and has flowed radially outward through the gaps between the coil ends is converted into an axially outward flow by the first inclined surfaces.

11 Claims, 11 Drawing Sheets

(51) Int. Cl.
| | | |
|---|---|---|
| H02K 3/24 | (2006.01) | |
| H02K 3/52 | (2006.01) | |
| H02K 5/20 | (2006.01) | |
| H02K 9/08 | (2006.01) | |
| H02K 11/33 | (2016.01) | |
| H02K 9/04 | (2006.01) | |
| H02K 9/02 | (2006.01) | |
| H02K 9/00 | (2006.01) | |
| H02K 9/19 | (2006.01) | |

(52) U.S. Cl.
CPC ............... *H02K 5/20* (2013.01); *H02K 9/08* (2013.01); *H02K 11/33* (2016.01); H02K 9/005 (2013.01); H02K 9/02 (2013.01); H02K 9/04 (2013.01); H02K 9/19 (2013.01); H02K 2203/03 (2013.01); H02K 2203/12 (2013.01)

(58) Field of Classification Search
CPC ... H02K 9/16; H02K 9/18; H02K 9/005; H02K 9/02; H02K 9/04; H02K 9/06; H02K 9/09; H02K 9/19; H02K 5/20; H02K 2203/12; H02K 2203/03; H02K 7/2706
USPC ...... 310/194, 62, 63, 65, 58, 52, 54, 57, 59, 310/60, 89, 214, 43, 60 A
See application file for complete search history.

(56) References Cited

U.S. PATENT DOCUMENTS

| | | | | |
|---|---|---|---|---|
| 3,761,748 A | * | 9/1973 | Baumann | H02K 9/06 310/58 |
| 4,492,885 A | * | 1/1985 | Kitamura | H02K 9/06 310/62 |
| 5,258,679 A | * | 11/1993 | Gassmann | H02K 3/50 310/194 |
| 6,066,905 A | * | 5/2000 | Wright | H02K 3/20 310/179 |
| 6,188,153 B1 | * | 2/2001 | Hokanson | H02K 9/005 310/52 |
| 6,570,284 B1 | * | 5/2003 | Agnes | H02K 1/185 310/156.01 |
| 6,658,721 B2 | * | 12/2003 | Kazama | H02K 1/12 29/596 |
| 6,700,235 B1 | * | 3/2004 | McAfee | H02K 9/06 310/52 |
| 6,784,586 B2 | * | 8/2004 | Akemakou | H02K 11/048 310/181 |
| 7,538,467 B2 | * | 5/2009 | Engquist | H02K 1/148 310/216.067 |
| 8,013,490 B2 | * | 9/2011 | Hino | H02K 3/34 310/194 |
| 8,179,015 B2 | * | 5/2012 | Nishikawa | H02K 21/044 310/156.66 |
| 8,203,240 B2 | * | 6/2012 | Hoshino | H02K 3/24 310/214 |
| 8,253,299 B1 | * | 8/2012 | Rittenhouse | B62M 6/90 310/257 |
| 2002/0149273 A1 | * | 10/2002 | Soitu | H02K 1/20 310/58 |
| 2003/0173839 A1 | | 9/2003 | Torii et al. | |
| 2004/0155550 A1 | * | 8/2004 | Yamamoto | H02K 1/24 310/194 |
| 2004/0222715 A1 | * | 11/2004 | Yamamura | H02K 1/148 310/216.015 |
| 2006/0244326 A1 | * | 11/2006 | Tamaoka | F16C 17/026 310/90 |
| 2009/0184591 A1 | * | 7/2009 | Hoshino | H02K 3/24 310/54 |

FOREIGN PATENT DOCUMENTS

| | | |
|---|---|---|
| JP | 2 219448 | 9/1990 |
| JP | 11 75345 | 3/1999 |
| JP | 2003 274605 | 9/2003 |
| JP | 2006 180655 | 7/2006 |
| JP | 2006 280157 | 10/2006 |
| JP | 2007 135306 | 5/2007 |
| JP | 2009 124771 | 6/2009 |

OTHER PUBLICATIONS

STIC EIC 2800 Search Report No. 528433 by Eileen Patton Dated Nov. 17, 2016.*
International Search Report Issued Dec. 25, 2012 in PCT/JP12/076196 Filed Oct. 10, 2012.

* cited by examiner

ROTARY ELECTRIC MACHINE INCLUDING A STATOR COIL END COOLING CONSTRUCTION AND ROTOR WITH DUAL FAN BLADES

TECHNICAL FIELD

The present invention relates to a rotary electric machine that is used in an electric automobile, for example, and particularly relates to a stator coil end cooling construction.

BACKGROUND ART

Conventional rotary electric machine cooling apparatuses include: an agitating fan that is disposed on an axial end portion of a rotor; a partition that is disposed in close proximity to an end portion of a stator coil; and cooling fins that are disposed on a core ring end portion, and are configured such that cooling air that is agitated by the agitating fan circulates through a route that passes through coil gaps in coil ends of the stator coil, then passes through between the cooling fins, and then passes through on an opposite side of the partition from the stator coil and returns to the agitating fan (see Patent Literature 1, for example).

CITATION LIST

Patent Literature

[Patent Literature 1] Japanese Patent Laid-Open No. 2007-135306 (Gazette)

SUMMARY OF THE INVENTION

Problem to be Solved by the Invention

In conventional rotary electric machine cooling apparatuses, because cooling air that has passed through between the coil gaps of the coil ends and the cooling fins strikes an inner circumferential wall surface of the stator frame and spreads axially and circumferentially, one problem has been that the intended circulating flow of cooling air is not formed efficiently, reducing cooling performance in the coil ends.

The present invention aims to solve the above problems and an object of the present invention is to provide a rotary electric machine that can increase cooling performance in coil ends of concentrated winding coils by converting a radially outward flow of cooling air that cools the coil ends of the concentrated winding coils and reaches an inner circumferential wall surface of a housing into an axially outward flow to form a circulating flow of cooling air.

Means for Solving the Problem

In order to achieve the above object, according to one aspect of the present invention, there is provided a rotary electric machine including: a housing including: a cylindrical member; and a pair of end plates that are disposed on two axial ends of the cylindrical member; a rotor that is disposed inside the housing such that two axial end portions of a shaft are rotatably supported by the pair of end plates; a cooling fan that is disposed on an axial end of the rotor; a stator that includes: a stator core in which a plurality of teeth are each disposed so as to project radially inward from an inner circumferential wall surface of an annular core back, and are arranged in a row at a predetermined pitch circumferentially; and a stator coil that is constituted by concentrated winding coils that are wound onto each of the teeth, the stator being held by the cylindrical member so as to surround the rotor; and an air channel dividing plate that is disposed between the end plate and coil ends of the concentrated winding coils that are positioned radially outside the cooling fan. A cyclic pathway is formed in which cooling air is blown out from the cooling fan, flows radially outward between the stator core and the air channel dividing plate, and then flows radially inward between the air channel dividing plate and the end plate, and returns to the cooling fan. The rotary electric machine includes a first air channel converting means that is disposed radially outside a gap between coil ends of circumferentially adjacent concentrated winding coils, and that converts into an axially outward flow the cooling air that is blown out from the cooling fan and has flowed radially outward through the gap between the coil ends.

Effects of the Invention

According to the present invention, cooling air that is blown out from the cooling fan and has flowed radially outward through gaps between the coil ends is converted to an axially outward flow by the first air channel converting means. In other words, the generation of circumferential flow of cooling air that results from flowing radially outward through the gaps between the coil ends and striking inner circumferential wall surfaces of the cylindrical member is suppressed. Thus, because the cooling air that is blown out from the cooling fan is conveyed efficiently to a side of the air channel dividing plate near an end plate, circulating flows of cooling air that flow through cyclic pathways for cooling the coil ends of the concentrated winding coils are formed efficiently, enabling the cooling performance of the concentrated winding coils to be increased.

DESCRIPTION OF EMBODIMENTS

Preferred embodiments of a rotary electric machine according to the present invention will now be explained with reference to the drawings.

Embodiment 1

Figure 1:
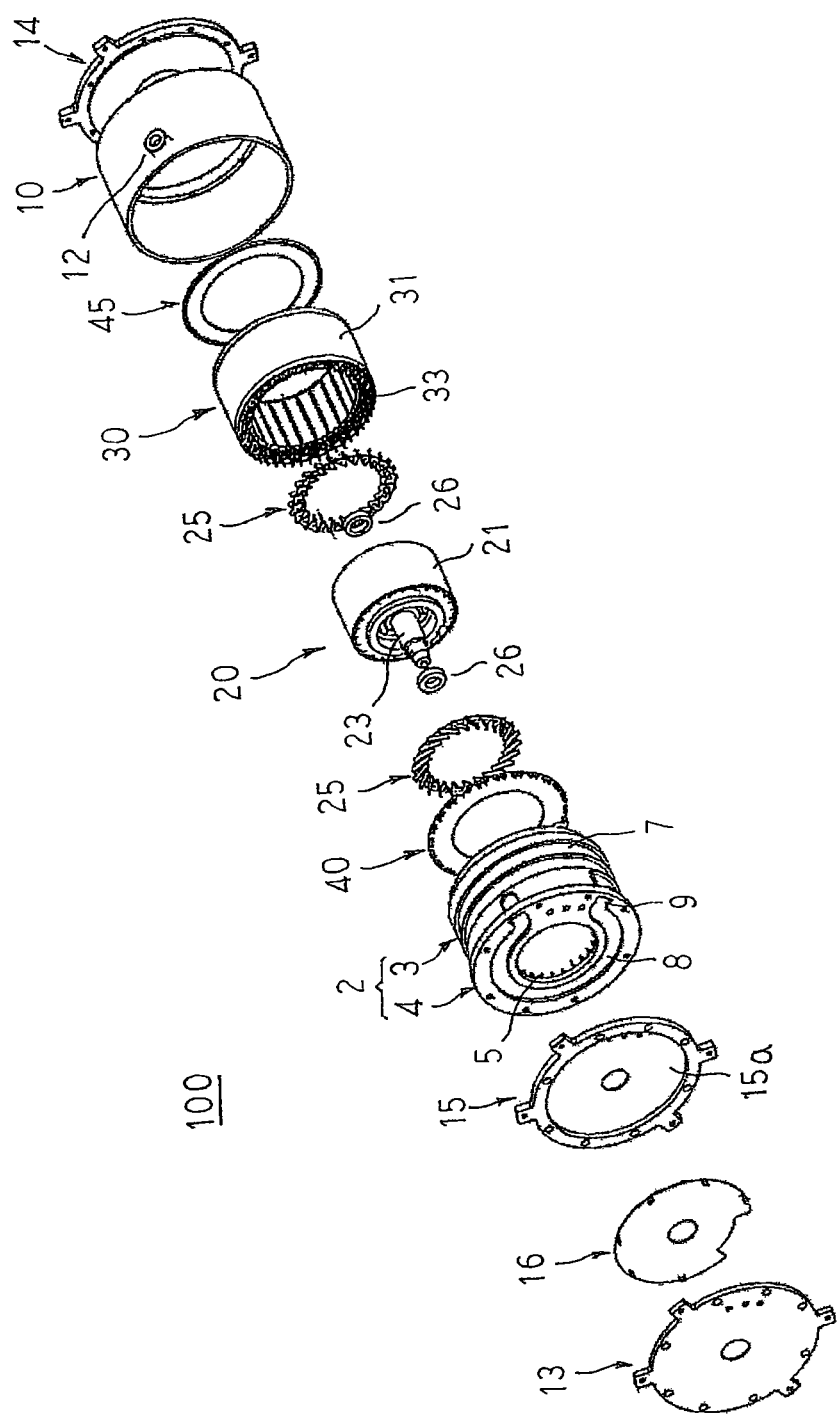
FIG. 1 is an exploded oblique projection that explains a configuration of a rotary electric machine according to Embodiment 1 of the present invention.
Figure 2:
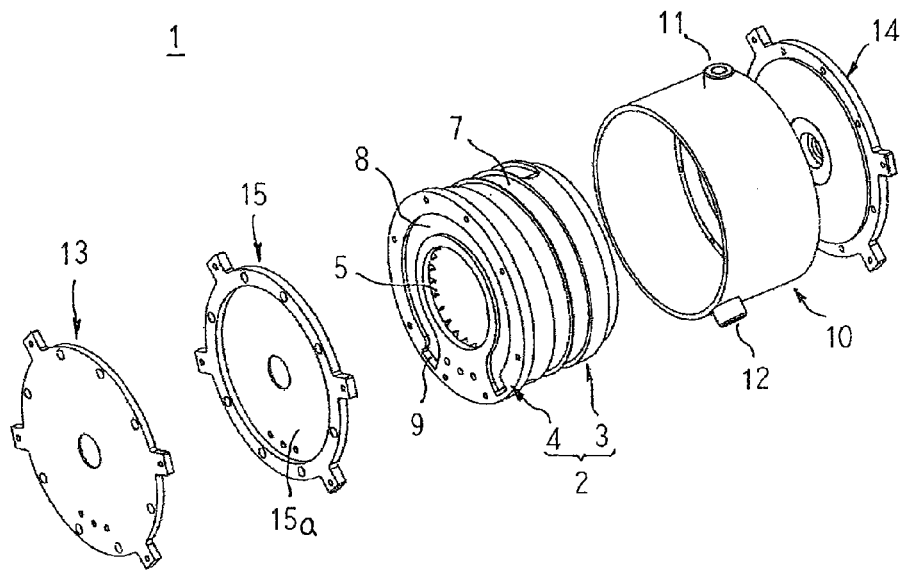
FIG. 2 is an exploded oblique projection that explains a configuration of a case of the rotary electric machine according to Embodiment 1 of the present invention.
Figure 3:
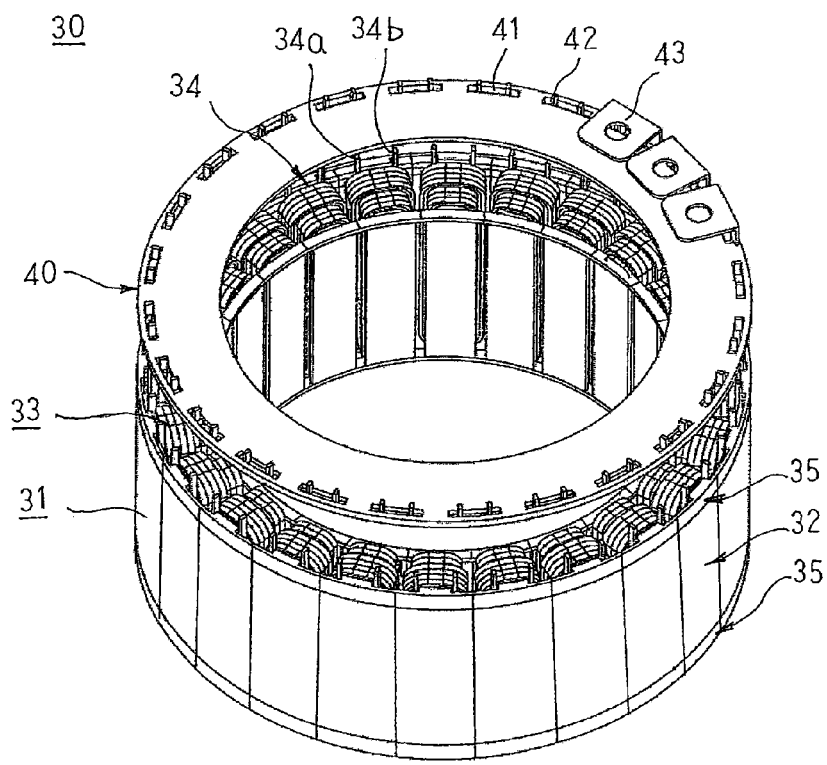
FIG. 3 is an exploded oblique projection that explains a configuration of a stator of the rotary electric machine according to Embodiment 1 of the present invention.
Figure 4:
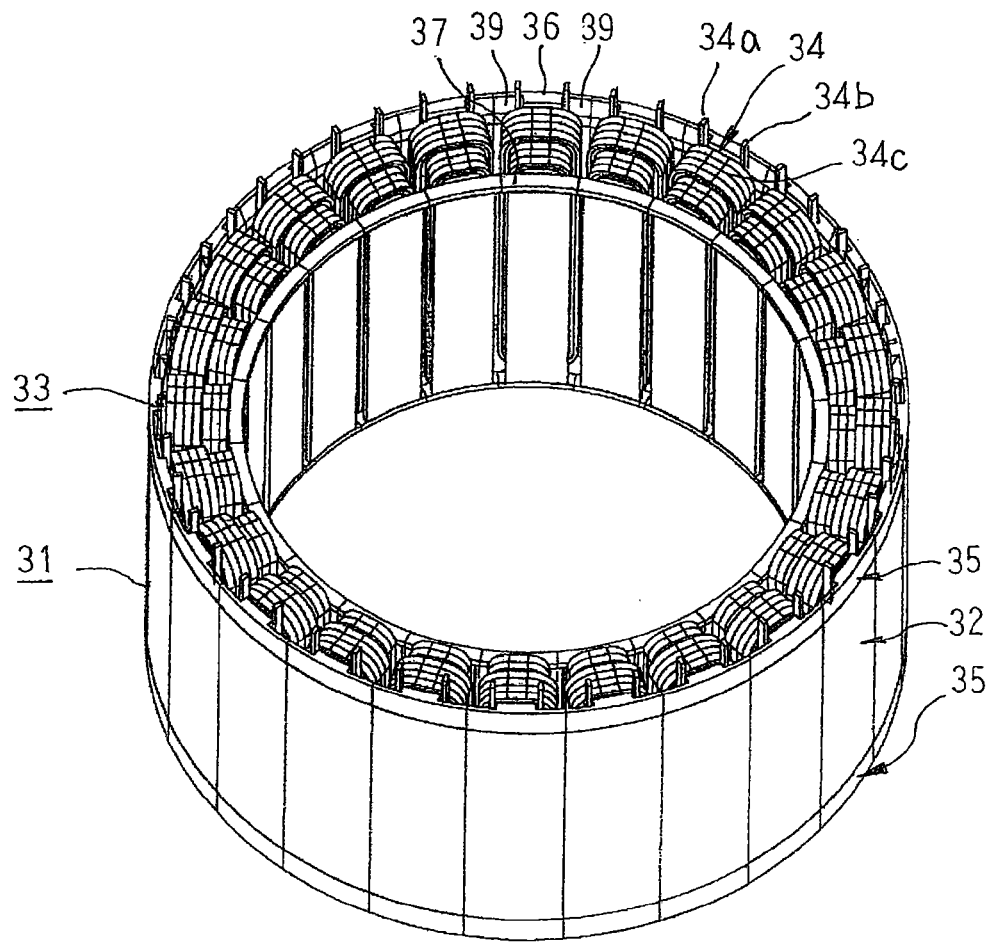
FIG. 4 is an oblique projection that shows a state of the stator of the rotary electric machine according to Embodiment 1 of the present invention before mounting a connecting board.
Figure 5:
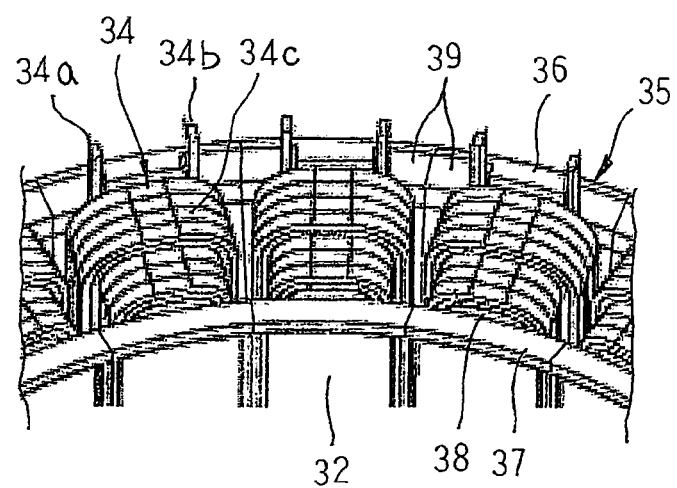
FIG. 5 is a partial enlargement that shows the state of the stator of the rotary electric machine according to Embodiment 1 of the present invention before mounting the connecting board.
Figure 6:
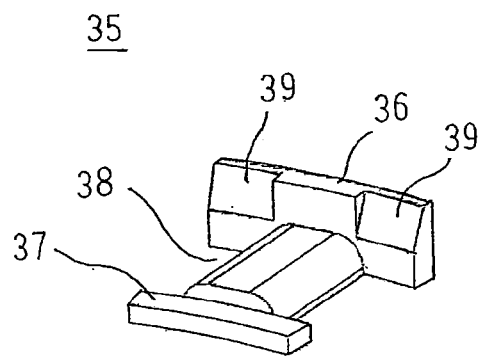
FIG. 6 is an oblique projection that shows an insulating member in the stator of the rotary electric machine according to Embodiment 1 of the present invention.
Figure 7:
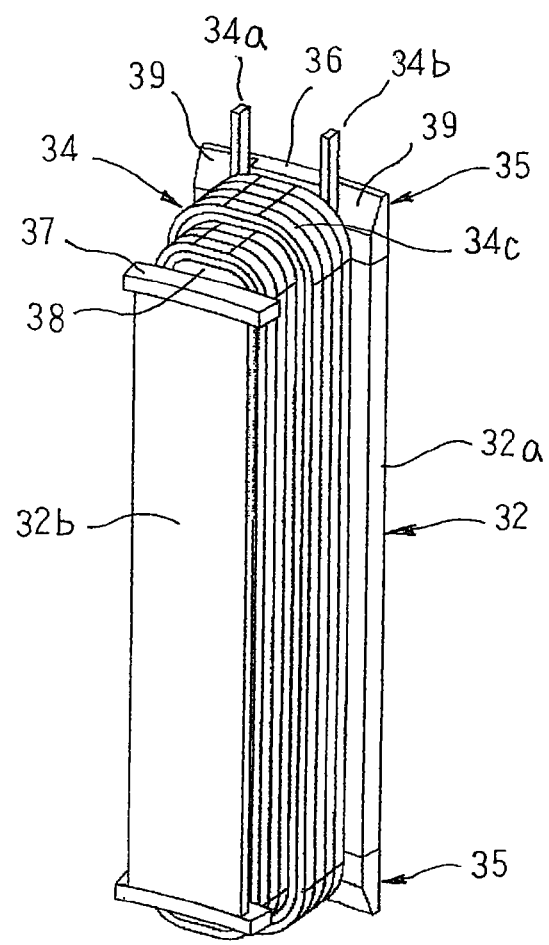
FIG. 7 is an oblique projection that shows a core unit in the stator of the rotary electric machine according to Embodiment 1 of the present invention.
Figure 8:
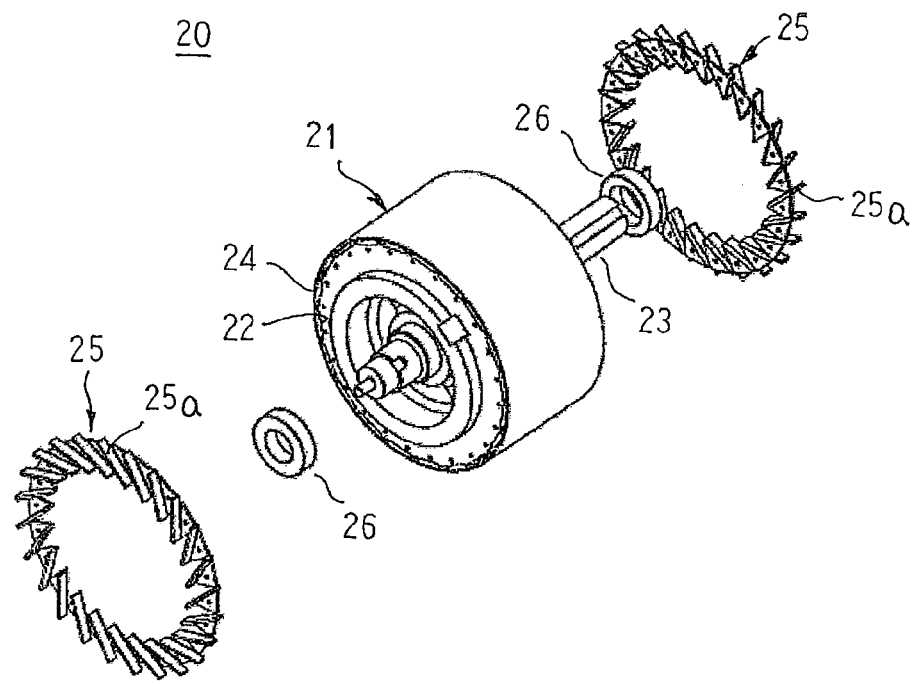
FIG. 8 is an exploded oblique projection that explains a configuration of a rotor of the rotary electric machine according to Embodiment 1 of the present invention.
Figure 9:
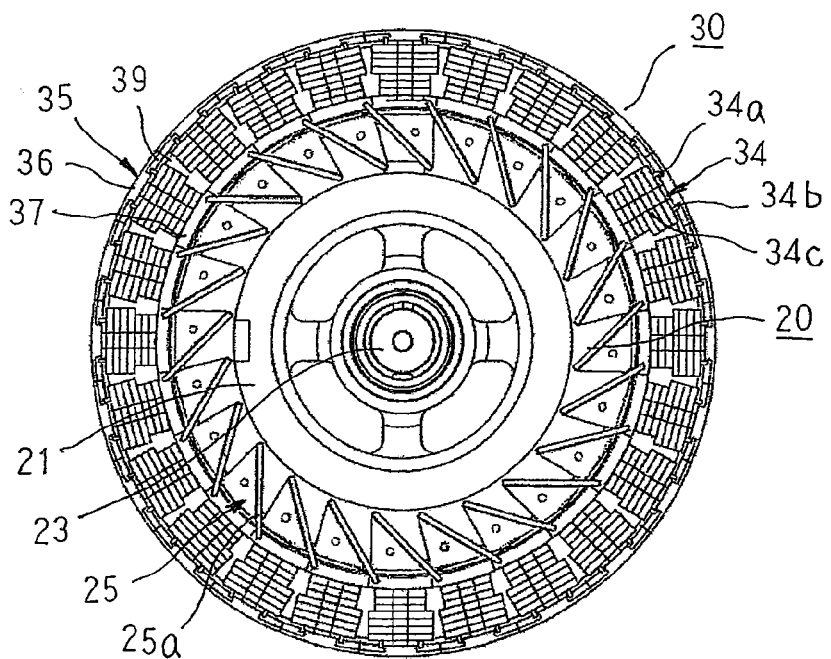
FIG. 9 is an end elevation that shows an assembled state of the stator and the rotor in the rotary electric machine according to Embodiment 1 of the present invention before mounting the connecting board.
Figure 10:
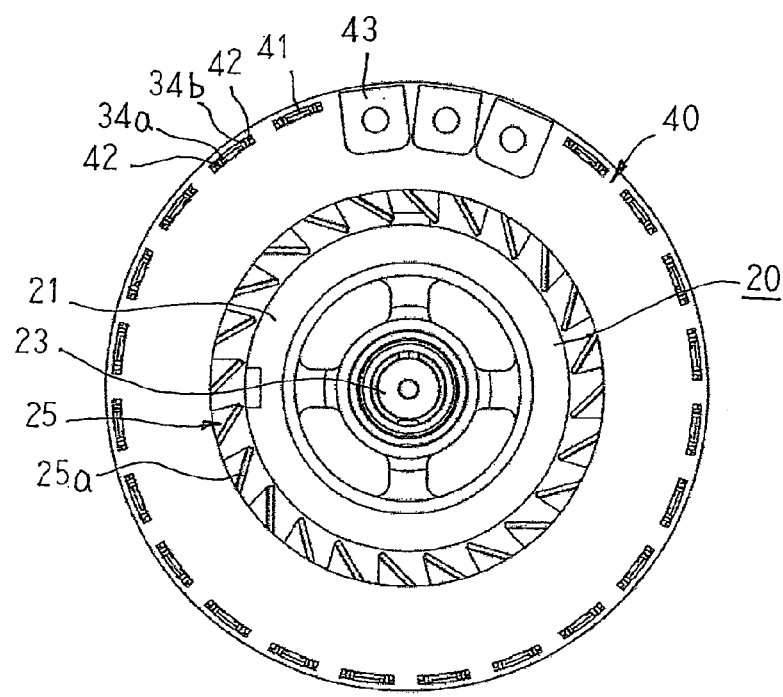
FIG. 10 is an end elevation that shows an assembled state of the stator and the rotor in the rotary electric machine according to Embodiment 1 of the present invention.
Figure 11:
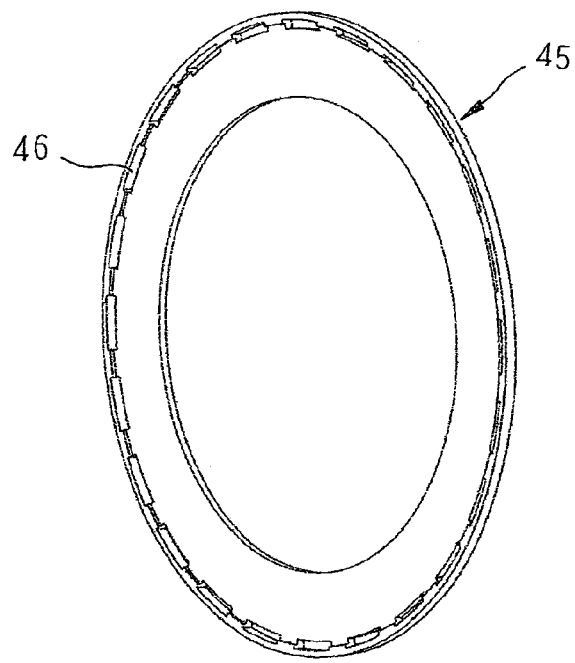
FIG. 11 is an oblique projection that shows an air channel dividing plate in the rotary electric machine according to Embodiment 1 of the present invention.
Figure 12:
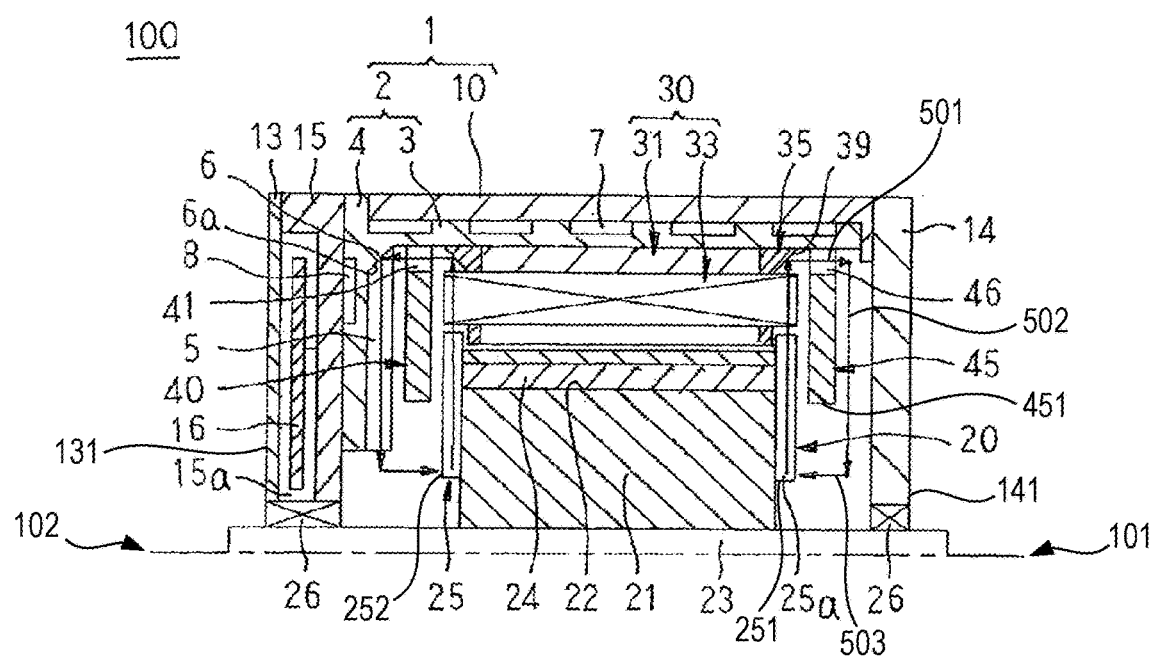
FIG. 12 is a partial cross section that shows the rotary electric machine according to Embodiment 1 of the present invention.

FIG. 1 is an exploded oblique projection that explains a configuration of a rotary electric machine according to Embodiment 1 of the present invention, FIG. 2 is an exploded oblique projection that explains a configuration of a case of the rotary electric machine according to Embodiment 1 of the present invention, FIG. 3 is an exploded oblique projection that explains a configuration of a stator of the rotary electric machine according to Embodiment 1 of the present invention, FIG. 4 is an oblique projection that shows a state of the stator of the rotary electric machine according to Embodiment 1 of the present invention before mounting a connecting board, FIG. 5 is a partial enlargement that shows the state of the stator of the rotary electric machine according to Embodiment 1 of the present invention before mounting the connecting board, FIG. 6 is an oblique projection that shows an insulating member in the stator of the rotary electric machine according to Embodiment 1 of the present invention, FIG. 7 is an oblique projection that shows a core unit in the stator of the rotary electric machine according to Embodiment 1 of the present invention, FIG. 8 is an exploded oblique projection that explains a configuration of a rotor of the rotary electric machine according to Embodiment 1 of the present invention, FIG. 9 is an end elevation that shows an assembled state of the stator and the rotor in the rotary electric machine according to Embodiment 1 of the present invention before mounting the connecting board, FIG. 10 is an end elevation that shows an assembled state of the stator and the rotor in the rotary electric machine according to Embodiment 1 of the present invention, FIG. 11 is an oblique projection that shows an air channel dividing plate in the rotary electric machine according to Embodiment 1 of the present invention, and FIG. 12 is a partial cross section that shows the rotary electric machine according to Embodiment 1 of the present invention.

In FIG. 1, a rotary electric machine 100 includes: a housing 1; a rotor 20 that is rotatably disposed inside the housing 1; a stator 20 that is held inside the housing 1 so as to surround the rotor 20.

As shown in FIG. 2, the housing 1 includes: an inner case 2 that holds the stator 30; an outer case 10 that is mounted onto the inner case 2 in an externally fitted state; a first cover 13; a second cover 14; and an intermediate cover 15.

The inner case 2 is produced into a floored cylindrical shape that is constituted by a cylindrical portion 3 and a bottom portion 4. The bottom portion 4 is produced into a ring shape that has a penetrating aperture at a central position of a circular flat plate. A plurality of radiating fins 5 are each disposed so as to stand perpendicularly on an inner wall surface of the bottom portion 4 so as to extend radially so as to be arranged at a predetermined pitch circumferentially. In addition, as shown in FIG. 12, an inclined portion 6 is disposed so as to protrude in an annular shape circumferentially around an entire circumference at an intersecting portion between the cylindrical portion 3 and the bottom portion 4. A first flow channel groove 7 is formed helically on an outer circumferential wall surface of the cylindrical portion 3 from a first axial end 101 to a second axial end 102, and a second flow channel groove 8 is formed in a C shape on an outer wall surface of the bottom portion 4. A second axial end of the first flow channel groove 7 and a first end of the second flow channel groove 8 are communicated by the communicating aperture 9.

Here, a second inclined surface 6a, which is a front surface of the inclined portion 6, constitutes a second air channel converting means, and is inclined at 45 degrees to a direction that is parallel to a central axis of the inner case 2. In other words, an angle of inclination of the second inclined surface 6a relative to the central axis of the inner case 2 is 45 degrees. An intersecting portion between the second inclined surface 6a and a plane that includes the central axis of the inner case 2 is a line segment. Moreover, the central axis of the inner case 2 is aligned with a central axis of the stator 30.

An outer case 10 is produced so as to have a cylindrical shape that has a flange portion at a first axial end. An inlet port 11 and a drainage port 12 are formed at first and second axial ends of the outer case 10. The first and second covers 13 and 14 are produced into annular flat plates, including a first end plate 141 and a second end plate 131, that have shaft passage apertures at a central position. The intermediate cover 15 is produced into an annular flat plate that has a shaft passage aperture at a central position, and a circuit board housing recess portion 15a is formed on one surface.

To assemble a housing 1 that is configured in this manner, the outer case 10 is first mounted from near a first axial end of the inner case 2 in an externally fitted state. Next, the second cover 14 is fastened to the first axial end of the outer case 10, and the first cover 13, which is stacked on a first surface of the intermediate cover 15, is also fastened to the bottom portion 4 of the inner case 2 to assemble the housing 1. The first flow channel groove 7 is thereby sealed by an inner circumferential wall surface of the outer case 10, and the second flow channel groove 8 is sealed by a second surface of the intermediate cover 15, such that a cooling water distribution channel is formed in which cooling water enters the first end of the first flow channel groove 7 through the inlet port 11, enters the first end of the second flow channel groove 8 from the second end of the first flow channel groove 7 by means of the communicating aperture 9, and reaches the drainage port 12 from a second end of the second flow channel groove 8. A controlling board 16 or the like is housed in the circuit board housing recess portion 15a, if required. Here, the cylindrical portion 3 of the inner case 2 and the outer case 10 constitute a cylindrical member of the housing 1, and the bottom portion 4 of the inner case 2, the first cover 13, the second cover 14, and the intermediate cover 15 constitute an end plate of the housing 1.

As shown in FIG. 8, the rotor 20 includes: an annular rotor core 21 in which twenty magnet housing apertures 22 are each disposed so as to pass through an outer circumferential edge portion so as to have an aperture direction in an axial direction so as to be disposed at a uniform angular pitch circumferentially; a shaft 23 that is inserted through and fixed to a central position of the rotor core 21; and permanent magnets 24 that are housed in and fixed to the respective magnet housing apertures 22. Cooling fans 25, including a first cooling fan 251 and a second cooling fan 252, are fixed to two axial end surfaces of the rotor core 21.

The stator 30 includes: an annular stator core 31; and a stator coil 33 that is constituted by concentrated winding coils 34 that are mounted onto the stator core 21.

The stator core 31 is configured annularly such that twenty-four core blocks 32 are arranged circumferentially, the core blocks 32 having T-shaped cross sections that are constituted by: a core back portion 32a that has a circular arc-shaped cross section; and a tooth 32b that is disposed so as to project radially inward from a circumferentially central portion of an inner circumferential surface of the core back portion 32a.

An insulating member 35 is a resin-molded body of insulating resin, in which a first flange portion 36 and a second flange portion 37 are formed integrally on two longitudinal ends of a drum portion 38, as shown in FIG. 6. First inclined surfaces 39 are formed on surfaces on two side portions of the first flange portion 36 that face the second flange portion 37 so as to have a surface shape that gradually becomes more distant from the second flange portion 37 toward an axially outer side. Insulating members 35 are disposed on two axial ends of the core blocks 32 such that rear surfaces of the drum portions 38 contact end surfaces of the teeth 32b, rear surfaces of the first flange portions 36 contact end surfaces of the core back portions 32a, and rear surfaces of the second flange portions 37 contact inner circumferential edges of the end surfaces of the teeth 32b. As shown in FIG. 7, the concentrated winding coils 34 are produced by winding conductor wires around the teeth 32b and the drum portions 38 of the insulating members 35 that are disposed on the two ends of the teeth 32b for a predetermined number of winds to constitute core units.

As shown in FIG. 3, the connecting board 40 is a resin-molded body that is made of an insulating resin, and is produced into a ring-shaped flat plate by insert-molding inserted conductors. Twenty-four rectangular ventilating apertures 41 are disposed so as to pass through an outer circumferential edge portion of the connecting board 40 at a uniform angular pitch circumferentially. Connecting terminals 42 project near a rear surface of the connecting board 40 from two circumferential sides inside each of the ventilating apertures 41, and three power supply terminals 43 project from an outer circumferential edge portion of the connecting board 40 on a rear surface side. Moreover, although not shown, the connecting terminals 42 and the power supply terminals 43 are connected by the inserted conductors such that the twenty-four concentrated winding coils 34 that are connected to the connecting terminals 42 constitute a three-phase alternating-current winding in which a U-phase coil, a V-phase coil, and a W-phase coil that are each configured by connecting eight concentrated winding coils 34 in parallel are wye-connected, and the three power supply terminals 43 become power supply terminals of the U-phase coil, the V-phase coil, and the W-phase coil, for example.

The core blocks 32 onto which the concentrated winding coils 34 have been wound are arranged annularly in a circumferential direction such that the circumferential side surfaces of the core back portions 32a contact each other, are inserted into an annular frame (not shown), and are fixed by shrinkage fitting, etc., to produce an annular stator 30, as shown in FIG. 4. As shown in FIG. 5, the first inclined surfaces 39 of the adjacent core blocks 32 become flush, and are positioned on a radially outer side between adjacent concentrated winding coils 34. Moreover, the core back portions 32a are arranged annularly in a circumferential direction to constitute an annular core back of the stator core 31. Portions of the concentrated winding coils 34 that project axially outside the stator core 31 constitute coil ends 34c. Coil terminals 34a and 34b, which are winding start end portions and the winding finish end portions of the concentrated winding coils 34, project axially from two circumferential sides at a second axial end of the concentrated winding coils 34.

Here, the first inclined surfaces 39 constitute a first air channel converting means, and are inclined at 45 degrees to a direction that is parallel to a central axis of the stator 30. In other words, an angle of inclination of the first inclined surfaces 39 relative to a direction that is parallel to the central axis of the stator 30 is 45 degrees. An intersecting portion between the first inclined surfaces 39 and a plane that includes the central axis of the stator 30 is a line segment.

The connecting board 40 is mounted onto the stator core 31 from a second axial end such that the adjacent coil terminals 34a and 34b of the adjacent concentrated winding coils 34 enter the ventilating apertures 41. Thus, the ventilating apertures 41 respectively face the first inclined surfaces 39 of the adjacent core blocks 32, and the adjacent coil terminals 34a and 34b of the adjacent concentrated winding coils 34 are in close proximity to the connecting terminals 42 that protrude into each of the ventilating apertures 41 on two circumferential sides. The coil terminals 34a and 34b and the connecting terminals 42 are joined together by solder, etc., and the connecting board 40 is attached to the stator 30. A stator coil is thereby produced that is configured into a three-phase alternating-current winding by wye-connecting a U-phase coil, a V-phase coil, and a W-phase coil that are each configured by connecting eight concentrated winding coils 34 in parallel.

As shown in FIG. 11, an air channel dividing plate 45 is a resin-molded body that is made of an insulating resin, and is produced into a ring-shaped flat plate having an inner circumferential edge 451. Twenty-four rectangular ventilating apertures 46 are disposed so as to pass through an outer circumferential edge portion of the air channel dividing plate 45 at a uniform angular pitch circumferentially.

To assemble the rotary electric machine 100 that is configured in this manner, the rotor 20 is first assembled. In addition, the stator 30 is assembled, and the connecting board 40 is mounted onto a second axial end of the stator 30.

Next, the outer case 10 is mounted from near a first axial end of the inner case 2 onto the inner case 2 in an externally fitted state, and the first cover 13, which is stacked on the first surface of the intermediate cover 15, is fastened to the bottom portion 4 of the inner case 2. Then, the stator 30 is press-fitted into and fixed to the cylindrical portion 3 of the inner case 2 from near the first axial end of the inner case 2 such that the connecting board 40 is oriented toward the bottom portion 4. In addition, the air channel dividing plate 45 is disposed inside the cylindrical portion 3 of the inner case 2 so as to be positioned at a first axial end of the stator 30 so as to leave a predetermined clearance from the concentrated winding coils 34. Here, the air channel dividing plate 45 is positioned such that the respective ventilating apertures 46 face the first inclined surfaces 39 of the adjacent core blocks 32, and is fixed using a fixing method such as screw clamping, etc.

Next, the rotor 20 is inserted into the cylindrical portion 3 of the inner case 2 by press-fitting a second axial end portion of the shaft 23 into a bearing 26 that is mounted into shaft passage apertures of the first cover 13 and the intermediate cover 15. Then, a first axial end portion of the shaft 23 is press-fitted into a bearing 26 that is mounted into a shaft passage aperture of the second cover 14, and the second cover 14 is fastened to the first axial end of the outer case 10 to assemble the rotary electric machine 100.

In a rotary electric machine 100 that is assembled in this manner, the first end portion of the shaft 23 is supported in the shaft passage aperture of the second cover 14 by means of the bearing 26, the second end portion of the shaft 23 is supported in the shaft passage apertures of the first cover 13 and the intermediate cover 15 by means of the bearing 26, and the rotor 20 is rotatably disposed inside the stator 30.

The first flow channel groove 7 is thereby sealed by the inner circumferential wall surface of the outer case 10, and the second flow channel groove 8 is sealed by the second surface of the intermediate cover 15, such that a cooling water distribution channel that functions as a cooling mechanism is formed in which cooling water enters the first end of the first flow channel groove 7 through the inlet port 11, enters the first end of the second flow channel groove 8 from the second end of the first flow channel groove 7 by means of the communicating aperture 9, and reaches the drainage port 12 from the second end of the second flow channel groove 8.

Because the air channel dividing plate 45 is disposed at the first axial end of the stator 30 so as to have a predetermined clearance from the coil ends 34c of the concentrated winding coils 34, a cyclic pathway is configured at the first axial end of the stator 30 in which cooling air is blown out from the cooling fan 25 and flows radially outward between the coil ends 34c, and then flows radially inward and returns to the cooling fan 25. Interference between the flow of cooling air that is blown out from the cooling fan 25 and flows radially outward between the coil ends 34c and the flow of cooling air that flows radially inward and returns to the cooling fan 25 is prevented by the air channel dividing plate 45, achieving a smooth circulating flow of cooling air.

Because the connecting board 40 is disposed at the second axial end of the stator 30 so as to have a predetermined clearance from the coil ends 34c of the concentrated winding coils 34, a cyclic pathway is configured at the second axial end of the stator 30 in which cooling air is blown out from the cooling fan 25 and flows radially outward between the coil ends 34c, and then flows radially inward and returns to the cooling fan 25. Interference between the flow of cooling air that is blown out from the cooling fan 25 and flows radially outward between the coil ends 34c and the flow of cooling air that flows radially inward and returns to the cooling fan 25 is prevented by the connecting board 40, achieving a smooth circulating flow of cooling air. Because this connecting board 40 also functions as an air channel dividing plate in this manner, cooling air flows in the vicinity of the connecting board 40, enabling cooling of the connecting board 40 itself.

As shown in FIG. 9, the first inclined surfaces 39 of adjacent insulating members 35 are positioned radially outside the coil ends 34c of adjacent concentrated winding coils 34. In addition, the ventilating apertures 41 of the connecting board 40 that is mounted onto the second axial end of the stator 30 respectively face the first inclined surfaces 39 of the adjacent insulating members 35 in an axial direction, as shown in FIGS. 10 and 12. The ventilating apertures 46 of the air channel dividing plate 45 that is disposed at the first axial end of the stator 30 respectively face the first inclined surfaces 39 of the adjacent insulating members 35 in an axial direction, as shown in FIG. 12. It is preferable to dispose the connecting board 40 and the air channel dividing plate 45 close to the coil ends 34c of the concentrated winding coils 34 to reduce the exposure of the inner circumferential wall surface of the cylindrical portion 3 of the inner case 2 between the connecting board 40 and the insulating members 35 and between the air channel dividing plate 45 and the insulating members 35.

As shown in FIGS. 9, 10, and 12, the blades 25a of the cooling fans 25 extend radially outward from the rotor core 21 such that outer circumferential edges thereof are disposed beyond the inner circumferential edges of the teeth 32b of the stator core 31 close to the coil ends 34c of the concentrated winding coils 34. As shown in FIGS. 10 and 12, the connecting board 40 and the air channel dividing plate 45 overlap with outer circumferential portions of the blades 25a of the cooling fan 25 in a radial direction.

Next, operation of the rotary electric machine 100 will be explained.

First, alternating-current power is supplied to the stator coil 33 from an external electric power supply through the power supply terminal 43, driving the rotor 20 to rotate. Specifically, the rotary electric machine 100 operates as a 20-pole, 24-slot inner-rotor three-phase motor.

As indicated by the arrows in FIG. 12, cooling air is blown out from the cooling fan 25 due to rotation of the rotor 20, and flows radially outward between the coil ends 34c of the concentrated winding coils 34. The cooling air that has flowed radially outward between the coil ends 34c of the concentrated winding coils 34 then strikes the first inclined surfaces 39 and is converted to an axially outward flow.

At the first axial end of the rotor 20, the cooling air that has been converted to an axially outward flow passes through the ventilating apertures 46 and flows in to a side of the air channel dividing plate 45 near the second cover 14 (represented by flow arrow 501), flows radially inward between the air channel dividing plate 45 and the second cover 14 (represented by flow arrow 502), passes through on an inner circumferential side of the air channel dividing plate 45 (represented by flow arrow 503), and is returned to the cooling fan 25. Heat generated in the concentrated winding coils 34 is thereby radiated from the coil ends 34*c* to the cooling air. The heat that is radiated to the cooling air is transferred to the second cover 14, a portion thereof is radiated from the front surface of the second cover 14, and a remaining portion is transferred from the second cover 14 to the cylindrical portion 3 and is radiated to cooling water that flows through the first flow channel groove 7.

At the same time, at the second axial end of the rotor 20, the cooling air that has been converted to an axially outward flow passes through the ventilating apertures 41 and flows in to a side of the connecting board 40 near the bottom portion 4, flows radially inward along the radiating fins 5 between the connecting board 40 and the bottom portion 4, passes through on an inner circumferential side of the connecting board 40, and is returned to the cooling fan 25. Heat generated in the concentrated winding coils 34 is thereby radiated from the coil ends 34*c* to the cooling air. In addition, the heat that is radiated to the cooling air is transferred to the bottom portion 4 by means of the radiating fins 5, and is radiated to cooling water that flows through the second flow channel groove 8.

The cooling water is injected through the inlet port 11, flows through the first flow channel groove 7 and the second flow channel groove 8, and is drained through the drainage port 12. Thus, heat that is generated in the stator 30 and transferred to the cylindrical portion 3 and the bottom portion 4 is radiated to the cooling water.

According to Embodiment 1, because first inclined surfaces 39 are disposed so as to be positioned on a radially outer side between the coil ends 34*c* of adjacent concentrated winding coils 34, cooling air that is blown out from cooling fans 25 and passes between the coil ends 34*c* of the concentrated winding coils 34 and flows radially outward is made to flow axially outward by the first inclined surfaces 39. In other words, the generation of circumferential flow of cooling air that results from flowing radially outward between the coil ends 34*c* of the concentrated winding coils 34 and striking inner wall surfaces of the cylindrical portion 3 is suppressed. Thus, because the cooling air that is blown out from the cooling fans 25 is conveyed efficiently to a side of the connecting board 40 near the bottom portion 4, and to a side of the air channel dividing plate 45 near the second cover 14, circulating flows of cooling air that flow through cyclic pathways for cooling the coil ends 34*c* of the concentrated winding coils 34 are formed efficiently, ensuring the airflow rate of the circulating flow, and enabling the cooling performance of the concentrated winding coils 34 to be increased.

Because the first inclined surfaces 39 are formed on first flange portions 36 of insulating members 35 that are disposed on two axial end surfaces of core blocks 32 in order to mount the concentrated winding coils 34, separate members for forming the first inclined surfaces 39 are not required, enabling the number of parts to be reduced.

Because the first inclined surfaces 39 are recessed into surfaces on two circumferential side portions of the first flange portions 36 that face radially inward, wall surfaces that are perpendicular to the first inclined surfaces 39 are formed on two circumferential sides of two first inclined surfaces 39 that are adjacent circumferentially. Thus, cooling air that strikes the first inclined surfaces 39 is prevented from diffusing circumferentially by these wall surfaces, and is made to flow axially outward efficiently.

Because the second inclined surface 6*a* is formed so as to face the first inclined surfaces 39 axially, cooling air that is converted to an axially outward flow by the first inclined surfaces 39, and has flowed through the ventilating apertures 41 to a side of the connecting board 40 near the bottom portion 4, is converted to a radially inward flow by the second inclined surface 6*a*. Thus, the generation of circumferential flow of the cooling air that results from flowing axially outward and striking the inner wall surface of the bottom portion 4 is suppressed.

Because the second inclined surface 6*a* is formed integrally on an intersecting portion between the cylindrical portion 3 and the bottom portion 4, the second inclined surface 6*a* can be formed integrally during production of the inner case 2. Thus, a separate member for forming the second inclined surface 6*a* is not required, enabling the number of parts to be reduced.

Because the connecting board 40 also functions as an air channel dividing plate, the number of parts can be reduced.

Because radiating fins 5 are formed in a radial pattern on an inner wall surface of the bottom portion 4, heat from the cooling air is radiated effectively. Thus, low-temperature cooling air can be returned to the cooling fans 25, enabling the cooling performance of the concentrated winding coils 34 to be increased.

Because a cooling water distribution channel that is constituted by a first flow channel groove 7 is mounted internally into a cylindrical member of a housing 1 that is constituted by the cylindrical portion 3 and the outer case 10, heat generated in the concentrated winding coils 34 is radiated to cooling water that flows through the cooling water distribution channel by means of the cooling air that flows through the cyclic pathway, enabling the cooling performance of the concentrated winding coils 34 to be increased.

Because a cooling water distribution channel that is constituted by a second flow channel groove 8 is mounted internally into a portion of the housing 1 that is constituted by the bottom portion 4 and the intermediate cover 15, heat generated in the concentrated winding coils 34 is radiated to cooling water that flows through the cooling water distribution channel by means of the cooling air that flows through the cyclic pathway, enabling the cooling performance of the concentrated winding coils 34 to be increased. In addition, heat generated in heat-generating elements that are housed inside the circuit board housing recess portion 15*a* of the intermediate cover 15 can be radiated effectively.

Because the blades 25*a* of the cooling fans 25 extend radially outward from the rotor core 21 so as to extend beyond inner circumferential edges of the teeth 32*b* of the stator core 31 close to the coil ends 34*c* of the concentrated winding coils 34, cooling air is blown in between the coil ends 34*c* of the concentrated winding coils 34 at high pressure. Thus, the cooling performance of the concentrated winding coils 34 can be increased.

Because the connecting board 40 and the air channel dividing plate 45 overlap with outer circumferential portions of the blades 25*a* of the cooling fan 25 in a radial direction, the cooling air that is blown out from the cooling fan 25 flows radially outward without diffusing axially. Thus, the cooling air that is blown out from the cooling fan 25 is supplied without loss to cool the coil ends 34*c* of the concentrated winding coils 34, enabling the cooling performance of the concentrated winding coils 34 to be increased.

Moreover, in Embodiment 1 above, ventilating apertures are formed on a connecting board so as to face respective first inclined surfaces in an axial direction that are positioned on a radially outer side between the adjacent concentrated winding coils, but ventilating apertures may be formed on a connecting board such that circumferential widths thereof are widened so as to face all first inclined surfaces in an axial direction that are positioned on a radially outer side between three or more circumferentially consecutive concentrated winding coils. In that case, the number of ventilating apertures is reduced, facilitating production of the connecting board.

Moreover, ventilating apertures that are formed on an air channel dividing plate may also be formed on the air channel dividing plate such that circumferential widths thereof are widened so as to face all first inclined surfaces in an axial direction that are positioned on a radially outer side between three or more circumferentially consecutive concentrated winding coils.

In Embodiment 1 above, a cooling mechanism is constituted by a cooling water distribution channel that is built into a housing, but the cooling mechanism is not limited to a cooling water distribution channel, and may be configured by disposing fins so as to stand on an external surface of the housing such as an outer circumferential surface of an outer case, for example.

In Embodiment 1 above, a second inclined surface is formed on an intersecting portion between a cylindrical portion and a bottom portion, but the second inclined surface may be formed on an intersecting portion between an outer case and a second cover.

In Embodiment 1 above, radiating fins are formed on a wall surface of a bottom portion of an inner case that faces a connecting board, but radiating fins may be formed on a wall surface of a second cover that faces an air channel dividing plate.

In Embodiment 1 above, a connecting board is produced into the ring-shaped flat plate, and functions as an air channel dividing plate, but if a connecting board is divided into a plurality of parts circumferentially or radially, for example, and cannot function as an air channel dividing plate, an air channel dividing plate should be disposed alongside the connecting board on an opposite side of the connecting board from a stator.

In Embodiment 1 above, an angle of inclination of first inclined surfaces relative to a direction that is parallel to a central axis of a stator is 45 degrees, but the angle of inclination of the first inclined surfaces is not limited to 45 degrees, provided that it is an angle of inclination that can efficiently form a circulating flow of cooling air that flows through a cyclic pathway for cooling coil ends of concentrated winding coils.

An angle of inclination of a second inclined surface relative to a direction that is parallel to a central axis of an inner case is 45 degrees, but the angle of inclination of the second inclined surface is not limited to 45 degrees, provided that it is an angle of inclination that can efficiently form a circulating flow of cooling air that flows through a cyclic pathway for cooling coil ends of concentrated winding coils.

Furthermore, from a viewpoint of increasing cooling efficiency, it is preferable for the angles of inclination of the first and second inclined surfaces to be greater than or equal to 30 degrees and less than or equal to 60 degrees, and particularly preferable to be 45 degrees.

Embodiment 2

Figure 13:
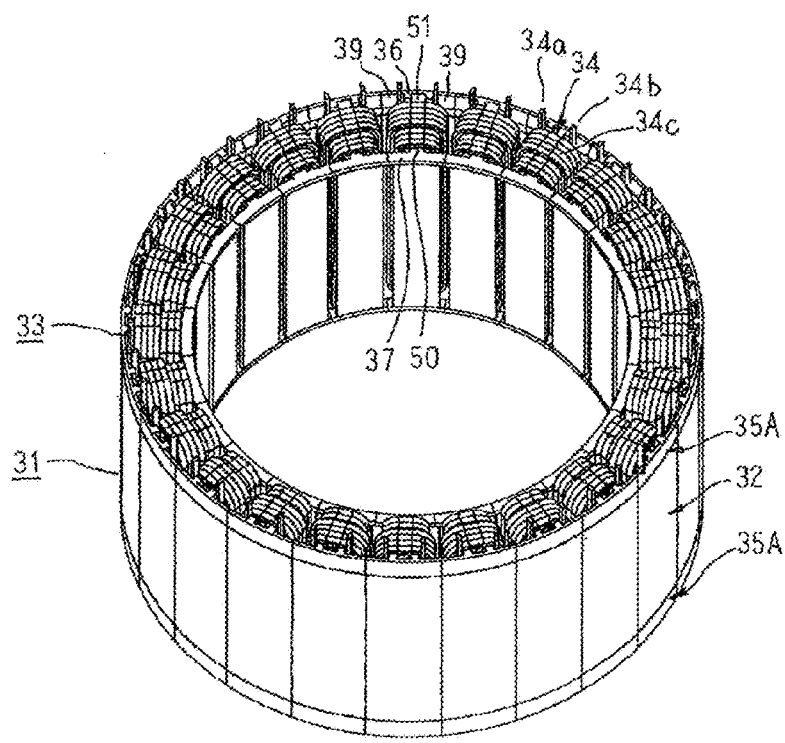
FIG. 13 is an oblique projection that shows a state of a stator of a rotary electric machine according to Embodiment 2 of the present invention before mounting a connecting board.
Figure 14:
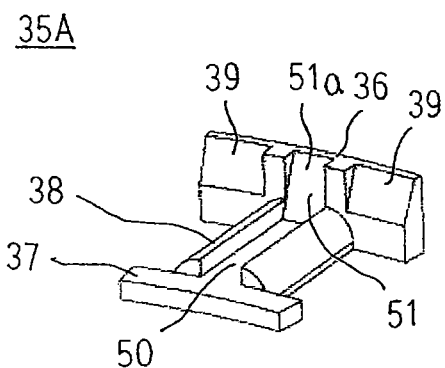
FIG. 14 is an oblique projection that shows an insulating member in the stator of the rotary electric machine according to Embodiment 2 of the present invention.
Figure 15:
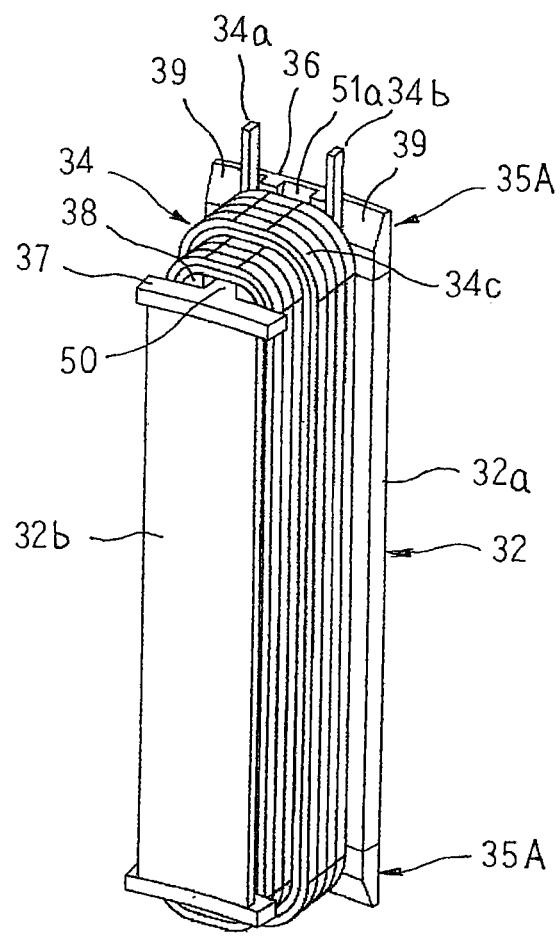
FIG. 15 is an oblique projection that shows a core unit in the stator of the rotary electric machine according to Embodiment 2 of the present invention.

FIG. 13 is an oblique projection that shows a state of a stator of a rotary electric machine according to Embodiment 2 of the present invention before mounting a connecting board, FIG. 14 is an oblique projection that shows an insulating member in the stator of the rotary electric machine according to Embodiment 2 of the present invention, and FIG. 15 is an oblique projection that shows a core unit in the stator of the rotary electric machine according to Embodiment 2 of the present invention.

In FIG. 14, an insulating member 35A includes: a drum portion 38; first and second flange portions 36 and 37 that are formed integrally on two longitudinal ends of the drum portion 38; a ventilating groove 50 that is formed on a surface of the drum portion 38 so as to have a groove direction in a longitudinal direction; and an inclined groove 51 that has a groove direction in an axial direction on a circumferentially central portion of a surface of the first flange portion 36 on a side near the first flange portion 37, i.e., that faces radially inward, and that has a groove depth that becomes gradually deeper toward an axially outer side. The ventilating groove 50 and the inclined groove 51 communicate, and a bottom surface of the inclined groove 51 constitutes a third inclined surface 51a.

As shown in FIG. 15, core units are produced by disposing insulating members 35A on two axial ends of core blocks 32 such that rear surfaces of the drum portions 38 contact end surfaces of the teeth 32b, rear surfaces of the first flange portions 36 contact end surfaces of the core back portions 32a, and rear surfaces of the second flange portions 37 contact inner circumferential edges of the end surfaces of the teeth 32b, and by winding conductor wires around the teeth 32b and the drum portions 38 of the insulating members 35A that are disposed on the two ends of the teeth 32b for a predetermined number of winds.

The core blocks 32 onto which the concentrated winding coils 34 have been wound are arranged annularly in a circumferential direction such that the circumferential side surfaces of the core back portions 32a contact each other, are inserted into an annular frame (not shown), and are fixed by shrinkage fitting, etc., to produce an annular stator 30, as shown in FIG. 13. The first inclined surfaces 39 of the adjacent core blocks 32 become flush, and are positioned on a radially outer side between coil ends 34c of adjacent concentrated winding coils 34. Ventilating channels that are constituted by the ventilating grooves 50 and the concentrated winding coils 34 extend radially so as to extend to the inclined grooves 51 from radially inside. Here, although not shown, ventilating apertures are formed on a connecting board and an air channel dividing plate so as to face the inclined grooves 51 axially.

Moreover, the rest of the configuration is formed in a similar or identical manner to that of Embodiment 1 above.

According to Embodiment 2, ventilating channels that are constituted by the ventilating grooves 50 and the concentrated winding coils 34 extend radially so as to extend to the inclined grooves 51 from radially inside. Thus, cooling air that is blown out from the cooling fans 25 flows radially outward, not only between the coil ends 34c of the concentrated winding coils 34, but also through the ventilating channels that are constituted by the ventilating grooves 50 and the concentrated winding coils 34, and is made to flow axially outward by the third inclined surfaces 51a. Contact area between the coil ends 34c of the concentrated winding coils 34 and the cooling air is thereby increased, enabling the cooling performance of the concentrated winding coils 34 to be increased.

Here, the third inclined surfaces 51a constitute a third air channel converting means. An intersecting portion between the third inclined surfaces 51a and a plane that includes a central axis of the stator is a line segment. In a similar manner to Embodiment 1, from a viewpoint of increasing cooling efficiency, it is preferable for the angle of inclination of the third inclined surfaces 51a relative to a direction that is parallel to the central axis of the stator 30 to be greater than or equal to 30 degrees and less than or equal to 60 degrees, and particularly preferable to be 45 degrees.

Embodiment 3

Figure 16:
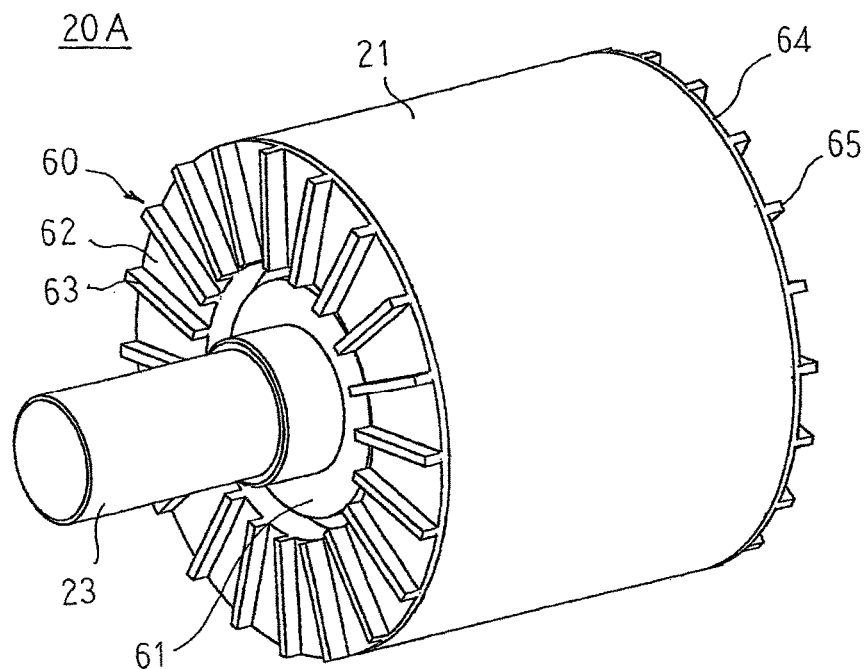
FIG. 16 is an oblique projection that explains a configuration of a rotor of a rotary electric machine according to Embodiment 3 of the present invention.
Figure 17:
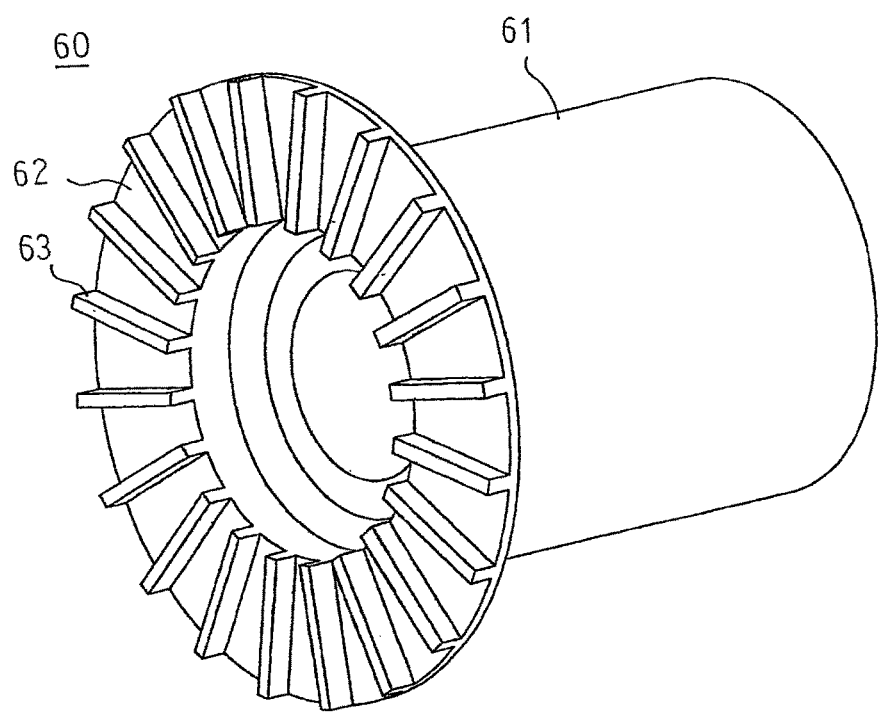
FIG. 17 is an oblique projection that explains a configuration of a spider in the rotor of the rotary electric machine according to Embodiment 3 of the present invention.

FIG. 16 is an oblique projection that explains a configuration of a rotor of a rotary electric machine according to Embodiment 3 of the present invention, and FIG. 17 is an oblique projection that explains a configuration of a spider in the rotor of the rotary electric machine according to Embodiment 3 of the present invention.

In FIGS. 16 and 17, a spider 60 includes: a cylindrical portion 61 that functions as a rotor core holding portion; an annular flange portion 62 that has a predetermined thickness, that projects radially outward from a second axial end of the cylindrical portion 61, and that extends around an entire circumference; and blades 63 that are disposed on an external surface of the flange portion 62 in a radial pattern. A rotor core bracing plate 64 is produced into an annular shape that has a predetermined thickness, and includes blades 65 that are disposed in a radial pattern on a first surface thereof. A rotor core 21 is mounted so as to be fitted over the cylindrical portion 61, is held between the flange portion 62 and the rotor core bracing plate 64, and is fixed to the shaft 23. Moreover, the blades 63 and 65 extend radially at a constant width and a constant height.

To assemble a rotor 20A, the rotor core 21 is fitted over the cylindrical portion 61 from near a first axial end of the cylindrical portion 61 until contact is made with the flange portion 62, the permanent magnets 24 are inserted into each of the magnet housing apertures 22 of the rotor core 21, and the rotor core bracing plate 64 is fitted into a first axial end of the cylindrical portion 61 such that a second surface of the rotor core bracing plate 64 contacts the end surface of the rotor core 21, and is fixed by shrinkage fitting. Next, the shaft 23 is inserted into the cylindrical portion 61, and is fixed by shrinkage fitting to assemble the rotor 20A.

The rotary electric machine according to Embodiment 3 is configured in a similar or identical manner to that of Embodiment 1 above except that the rotor 20A is used instead of the rotor 20.

In a rotary electric machine that is configured in this manner, the flange portion 62 and the rotor core bracing plate 64 on which the blades 63 and 65 are formed rotate together with the rotor 20A, and function as cooling fans. Thus, cooling air flows between the blades 63 and 65 from inner circumferential ends of the blades 63 and 65 along an external surface of the flange portion 62 and along a first surface of the rotor core bracing plate 64, and is blown out from outer circumferential ends of the blades 63 and 65. The cooling air that is blown out from the outer circumferential ends of the blades 63 and 65 flows radially outward between the coil ends 34c of the concentrated winding coils 34, and is converted to axially outward flows by the first inclined surfaces 39.

At the first axial end of the rotor 20A, the cooling air that has been converted to an axially outward flow passes through the ventilating apertures 46 and flows in to a side of the air channel dividing plate 45 near the second cover 14, flows radially inward between the air channel dividing plate 45 and the second cover 14, passes through on an inner circumferential side of the air channel dividing plate 45, and is returned to an inner circumferential side of the rotor core bracing plate 64.

At the same time, at the second axial end of the rotor 20A, the cooling air that has been converted to an axially outward flow passes through the ventilating apertures 41 and flows in to a side of the connecting board 40 near the bottom portion 4, flows radially inward along the radiating fins 5 between the connecting board 40 and the bottom portion 4, passes through on an inner circumferential side of the connecting board 40, and is returned to an inner circumferential side of the flange portion 62.

Consequently, in Embodiment 3, a circulating flow of cooling air can also be formed efficiently in a similar manner to Embodiment 1 above, enabling the cooling performance of the concentrated winding coils 34 to be increased.

Now, because the flange portion 62 and the rotor core bracing plate 64 function to restrict the axial movement of the rotor core 21, it is necessary to increase rigidity by increasing thickness. Thus, eddy current loss in the stator coil 33 and the slots of the stator core 31 due to harmonics arises in the flange portion 62 and the rotor core bracing plate 64, generating heat. The heat generated in the flange portion 62 and the rotor core bracing plate 64 is transferred to the permanent magnets 24 through the rotor core 21 or directly, giving rise to demagnetization of the permanent magnets 24.

In Embodiment 3, the blades 63 are disposed on the external surface of the flange portion 62 of the spider 60, and the blades 65 are formed on the first surface of the rotor core bracing plate 64. Thus, the blades 63 and 65 function as ribs, increasing rigidity without increasing the thickness of the flange portion 62 and the rotor core bracing plate 64. In other words, reductions in thickness of the flange portion 62 and the rotor core bracing plate 64 are enabled. Eddy current loss in the flange portion 62 and the rotor core bracing plate 64 that results from the slot harmonics of the stator coil 33 and the slots of the stator core 31 can thereby be reduced, suppressing the occurrence of demagnetization of the permanent magnets 24, and enabling motor efficiency to be improved. In addition, because the weight of the rotor 20A, particularly weight on the outer circumferential side of the rotor 20A, is reduced, inertia of the rotor 20A is reduced, enabling motor accelerating performance to be improved.

Because the flange portion 62 and the rotor core bracing plate 64 function as cooling fans, cooling air flows along the surfaces of the flange portion 62 and the rotor core bracing plate 64. Thus, because heat generated in the permanent magnets 24 is transferred to the flange portion 62 and the rotor core bracing plate 64 through the rotor core 21 or directly, and is radiated to the cooling air from the flange portion 62 and the rotor core bracing plate 64, temperature increases in the permanent magnets 24 are suppressed, suppressing the occurrence of demagnetization of the permanent magnets 24.

Because the flange portion 62 and the rotor core bracing plate 64 function as cooling fans, it is not necessary to prepare cooling fans as separate parts, reducing the number of parts, and improving assembly of the rotor 20A.

Because the flange portion 62 of the spider 60 functions as axial positioning for the rotor core 21, axial positioning of the rotor core 21 relative to the spider 60 is facilitated.

Because the rotor core 21 is held between the flange portion 62 and the rotor core bracing plate 64, dislodging of the permanent magnets 24 embedded in the rotor core 21 is prevented.

Moreover, in Embodiment 3 above, the rotor core and the cylindrical portion of the spider, the rotor core bracing plate and the cylindrical portion of the spider, and the cylindrical portion of the spider and the shaft are fixed by shrinkage fitting, but the fixing methods thereof are not limited to shrinkage fitting, and fixing methods such as cooling fitting or press fitting may be used.

In Embodiment 3 above, the rotor core holding portion of the spider is formed into a cylindrical body, but the shape of the rotor core holding portion is not limited to a cylindrical body, provided that it is a tubular body that has an external shape that conforms to a central aperture shape of a rotor core, and an internal shape that conforms to an external shape of a shaft.

Embodiment 4

Figure 18:
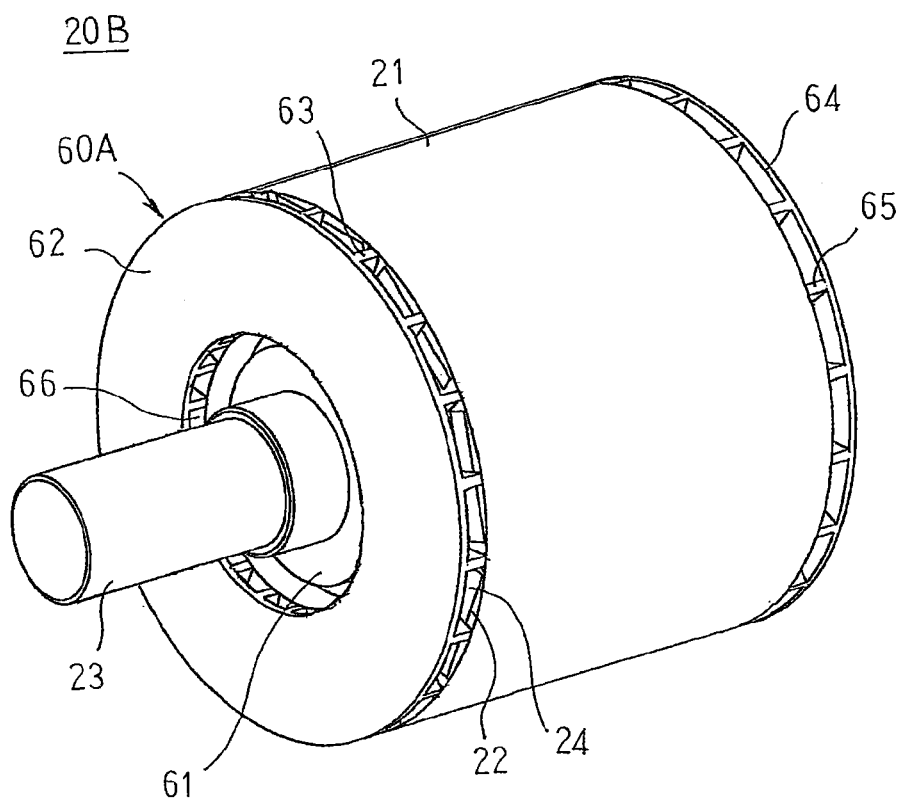
FIG. 18 is an oblique projection that explains a configuration of a rotor of a rotary electric machine according to Embodiment 4 of the present invention.

FIG. 18 is an oblique projection that explains a configuration of a rotor of a rotary electric machine according to Embodiment 4 of the present invention.

In FIG. 18, a spider 60A includes: a cylindrical portion 61; an annular flange portion 62 that has a predetermined thickness, that projects radially outward from a second axial end of the cylindrical portion 61, and that extends around an entire circumference; blades 63 that are disposed on an inner surface of the flange portion 62 in a radial pattern; and communicating apertures 66 that are formed at a second axial end of the cylindrical portion 61 so as to communicate between spaces between adjacent blades 63 and an interior portion of the cylindrical portion 61. A rotor core bracing plate 64 is fitted into a first axial end of the cylindrical portion 61 such that a first surface on which blades 65 are disposed in a radial pattern is oriented toward the flange portion 62. Although not shown, communicating apertures are formed at a first axial end of the cylindrical portion 61 so as to communicate between spaces between adjacent blades 65 and an internal portion of the cylindrical portion 61.

To assemble a rotor 20B, the rotor core 21, in which permanent magnets 24 have been inserted into respective magnet housing apertures 22, is fitted over the cylindrical portion 61 from near a first axial end of the cylindrical portion 61 until contact is made with the blades 63, and the rotor core bracing plate 64 is fitted into a first axial end of the cylindrical portion 61 such that the blades 65 of the rotor core bracing plate 64 contact the end surface of the rotor core 21, and is fixed by shrinkage fitting. Next, the shaft 23 is inserted into the cylindrical portion 61, and is fixed by shrinkage fitting to assemble the rotor 20B.

In a rotor 20B that is configured in this manner, the blades 63 that are disposed on the inner surface of the flange portion 62 are pressed against an end surface of the rotor core 21 and end surfaces of the permanent magnets 24, and the blades 65 that are on the first surface of the rotor core bracing plate 64 are pressed against an end surface of the rotor core 21 and end surfaces of the permanent magnets 24. Here, the numbers of blades 63 and 65 are greater than or equal to the number of permanent magnets 24 so as to be positioned at the two axial ends of the permanent magnets 24 without fail.

The rotary electric machine according to Embodiment 4 is configured in a similar or identical manner to that of Embodiment 3 above except that the rotor 20B is used instead of the rotor 20A.

In a rotary electric machine that is configured in this manner, the flange portion 62 and the rotor core bracing plate 64 on which the blades 63 and 65 are formed rotate together with the rotor 20B, and function as cooling fans. Thus, at the first end of the rotor 20B, air is sucked in between the rotor core bracing plate 64 and the rotor core 21 from an inner circumferential side of the blades 65, i.e., through the communicating apertures, flows along the end surface of the rotor core 21 between the blades 65, is blown out from the outer circumferential ends of the spaces between the blades 65, and is supplied to cool the coil ends 34c of the concentrated winding coils 34. At the second end of the rotor 20B, air is sucked in between the flange portion 62 and the rotor core 21 from an inner circumferential side of the blades 63, i.e., through the communicating apertures 66, flows along the end surface of the rotor core 21 between the blades 63, is blown out from the outer circumferential ends of the spaces between the blades 63, and is supplied to cool the coil ends 34c of the concentrated winding coils 34.

In Embodiment 4, because the blades 63 are disposed on the external surface of the flange portion 62 of the spider 60A, and the blades 65 are formed on the first surface of the rotor core bracing plate 64, reductions in thickness of the flange portion 62 and the rotor core bracing plate 64 are enabled in a similar or identical manner to that of Embodiment 3 above. Consequently, in Embodiment 4, motor efficiency and motor accelerating performance can also be improved.

The flange portion 62 and the rotor core bracing plate 64 function as cooling fans such that cooling air flows along the end surfaces of the rotor core 21 and the end surfaces of the permanent magnets 24. Thus, heat generated in the permanent magnets 24 is radiated to the cooling air from the end surfaces of the permanent magnets 24, and is also transferred to the rotor core 21 and radiated to the cooling air from the end surfaces of the rotor core 21. In addition, because the blades 63 and 65 are in contact with the end surfaces of the permanent magnets 24, heat generated in the permanent magnets 24 is transferred to the blades 63 and 65, and is radiated to the cooling air. Consequently, in Embodiment 4, temperature increases in the permanent magnets 24 are also suppressed in a similar or identical manner to that of Embodiment 3 above, suppressing occurrence of demagnetization of the permanent magnets 24, and the number of parts is also reduced, improving assembly of the rotor 20B.

Because the flange portion 62 of the spider 60A functions as axial positioning for the rotor core 21, axial positioning of the rotor core 21 relative to the spider 60A is facilitated.

Because the rotor core 21 is held between the flange portion 62 and the rotor core bracing plate 64, dislodging of the permanent magnets 24 embedded in the rotor core 21 is prevented.

Embodiment 5

Figure 19:
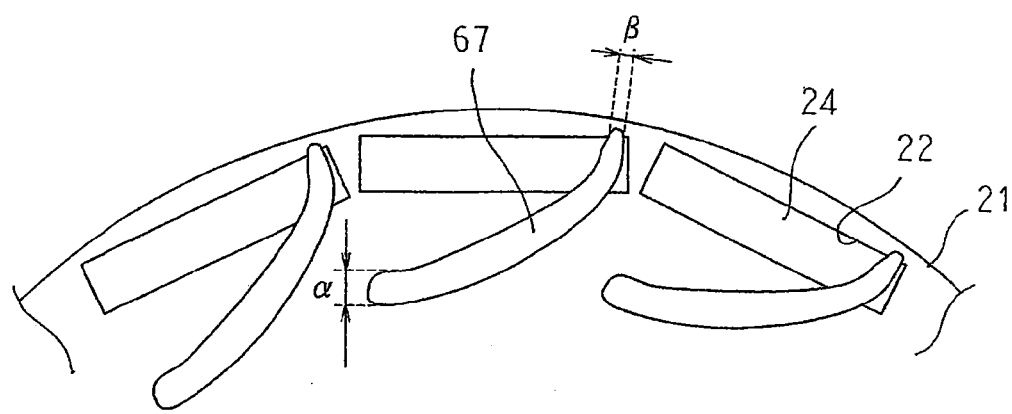
FIG. 19 is a partial plan that explains a blade shape in a rotor of a rotary electric machine according to Embodiment 5 of the present invention.

FIG. 19 is a partial plan that explains a blade shape in a rotor of a rotary electric machine according to Embodiment 5 of the present invention.

In FIG. 19, blades 67 are formed such that widths thereof widen gradually from an outer circumferential end to an inner circumferential end. Specifically, an inner circumferential width a of the blades 67 is wider than an outer circumferential width 8. The blades 67 are formed on a flange portion 62 and a rotor core bracing plate 64 so as to be equal in number to the number of permanent magnets 24, and outer circumferential end portions thereof contact near respective first circumferential end portions of the permanent magnets 24.

Moreover, the rest of the configuration is formed in a similar or identical manner to that of Embodiment 4 above.

In Embodiment 5, widths of blades 67 are formed so as to widen gradually from an outer circumferential end to an inner circumferential end. This is equivalent to the thicknesses of the flange portion 62 and the rotor core bracing plate 64 including the blades 67 becoming gradually thicker from an outer circumferential side to an inner circumferential side. Thick portions of the flange portion 62 and the rotor core bracing plate 64 are thereby removed from near the stator coil 33 and the stator core 31, enabling eddy current loss in the flange portion 62 and the rotor core bracing plate 64 that results from the slot harmonics of the stator coil 33 and the slots of the stator core 31 to be reduced, improving motor efficiency.

Now, if the present rotary electric machine is applied to an automobile driving motor, a large current flows through the stator coil when starting to move, and magnetic flux that is produced by the stator coil enters internal portions of the rotor. Here, there is a risk that the magnetic flux that is produced by the stator coil may flow through the trailing side of the permanent magnets in the direction of rotation, and the permanent magnets may demagnetize. Since most vehicle motion is forward motion, the demagnetized portions of the permanent magnets will be concentrated on the trailing side in the direction of rotation during forward motion of the vehicle. Moreover, the direction of rotation during forward motion of the vehicle shall be designated the main direction of rotation.

Thus, if the present rotary electric machine is applied to an automobile driving motor such that the first circumferential end portions near the permanent magnets 24 that the blades 67 contact are near the trailing end portions of the permanent magnets 24 in the main direction of rotation, regions near the trailing end portions of the permanent magnets 24 in the main direction of rotation are cooled effectively by the blades 67, enabling the occurrence of demagnetization of the permanent magnets 24 to be suppressed.

Next, a relationship between the number of blades on the cooling fans and the number of permanent magnets and the number of slots in the stator core will be explained.

Wind noise factors in the rotary electric machine include cooling fan wind noise, wind noise due to the magnetic poles, wind noise due to the slots of the stator core, etc., and when harmonic components of such wind noise overlap, wind noise is increased. In other words, in order to reduce wind noise, it is important to avoid overlap between the harmonic components of wind noise generated by the cooling fans and the harmonic components of wind noise due to the magnetic poles, and overlap between harmonic components of wind noise generated by cooling fans and harmonic components of wind noise due to the slots of the stator core.

From the above, it is preferable from the viewpoint of wind noise reduction to make the number of blades different than multiples of divisors of the number of permanent magnets and the number of slots in the stator core, and particularly desirable to make them prime numbers. In addition, if the numbers of blades of the cooling fans that are disposed on the two axial end portions of the rotor core are made different, overlap between the harmonic components of wind noise due to the two cooling fans is avoided, enabling wind noise to be reduced.

Embodiment 6

Figure 20:
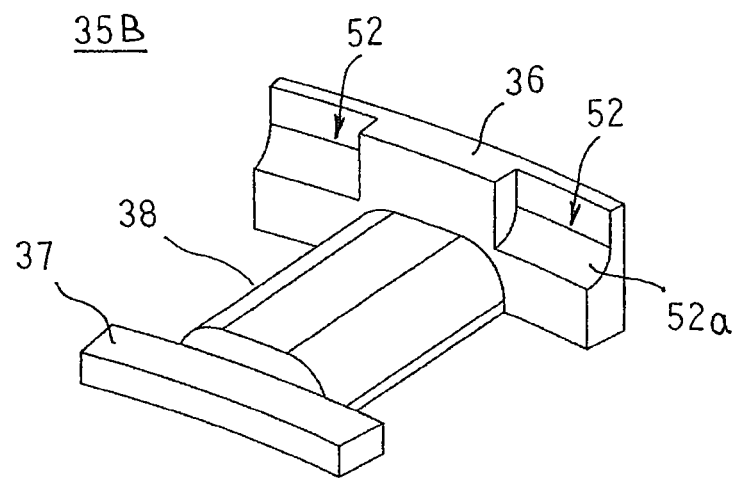
FIG. 20 is an oblique projection that shows an insulating member in a stator of a rotary electric machine according to Embodiment 6 of the present invention.

FIG. 20 is an oblique projection that shows an insulating member in a stator of a rotary electric machine according to Embodiment 6 of the present invention.

In FIG. 20, first concave surfaces 52 are formed on an insulating member 35B on surfaces on two side portions of a first flange portion 36 that face a second flange portion 37 so as to have a surface shape that gradually becomes more distant from the second flange portion 37 toward an axially outer side and then becomes constant. An intersecting portion between the first concave surfaces 52 and a plane that includes a central axis of the stator is an approximate L shape in which a line segment projects tangentially from a first end of a circular arc that has a central angle of 90 degrees. First curved surfaces 52a near root ends of these first concave surfaces 52 that have circular arc-shaped cross sections constitute a first air channel converting means.

Moreover, the rest of the configuration is formed in a similar or identical manner to that of Embodiment 1 above.

In Embodiment 6, the first concave surfaces 52 of adjacent insulating members 35B are positioned radially outside the coil ends 34c of adjacent concentrated winding coils 34. Thus, cooling air that is blown out from the cooling fans 25 and passes between the coil ends 34c of the concentrated winding coils 34 and flows radially outward is made to flow axially outward by the first curved surfaces 52a of the first concave surfaces 52. In other words, the generation of circumferential flow of cooling air that results from flowing radially outward between the coil ends 34c of the concentrated winding coils 34 and striking inner wall surfaces of the cylindrical portion 3 is suppressed. As a result, because the cooling air that is blown out from the cooling fans 25 is conveyed efficiently to a side of a connecting board 40 near the bottom portion 4, and to a side of an air channel dividing plate 45 near the second cover 14, circulating flows of cooling air that flow through cyclic pathways for cooling the coil ends 34c of the concentrated winding coils 34 are formed efficiently, ensuring the airflow rate of the circulating flow, and enabling the cooling performance of the concentrated winding coils 34 to be increased.

Moreover, in Embodiment 6 above, the cross-sectional shape of the first curved surfaces is a circular arc that has a central angle of 90 degrees, but the cross-sectional shape of the first curved surfaces is not limited to a circular arc that is 90 degrees, provided that it is a curve that can convert the cooling airflow that has flowed radially outward into an axial flow.

Embodiment 7

Figure 21:
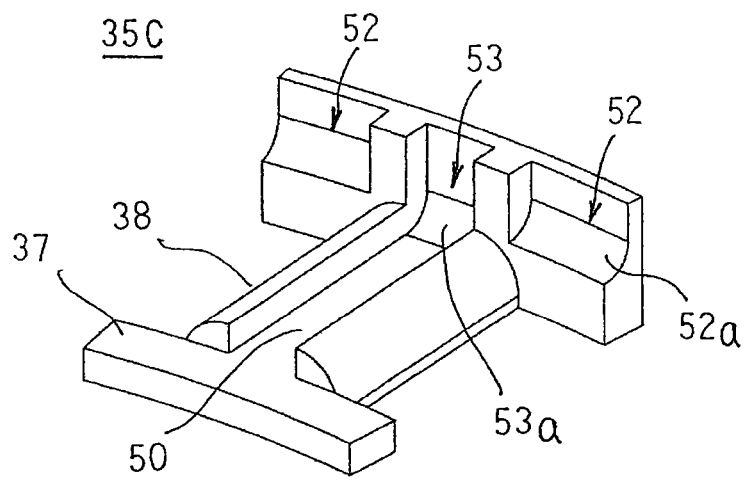
FIG. 21 is an oblique projection that shows an insulating member in a stator of a rotary electric machine according to Embodiment 7 of the present invention.

FIG. 21 is an oblique projection that shows an insulating member in a stator of a rotary electric machine according to Embodiment 7 of the present invention.

In FIG. 21, an insulating member 35C includes: a drum portion 38; first and second flange portions 36 and 37 that are formed integrally on two longitudinal ends of the drum portion 38; a ventilating groove 50 that is formed on a surface of the drum portion 38 so as to have a groove direction in a longitudinal direction; and an auxiliary ventilating groove 53 that is formed so as to communicate with the ventilating groove 50 so as to have a groove direction in an axial direction on a circumferentially central portion of a surface of the first flange portion 36 on a side near the first flange portion 37, i.e., that faces radially inward. The auxiliary ventilating groove 53 is formed so as to have a groove shape that has a groove depth that becomes gradually deeper toward an axially outer side, and then becomes constant. An intersecting portion between the auxiliary ventilating groove 53 and a plane that includes a central axis of the stator is an approximate L shape in which a line segment projects tangentially from a first end of a circular arc that has a central angle of 90 degrees. A second curved surface 53a near a root end of this auxiliary ventilating groove 53 that has a circular arc-shaped cross section constitutes a third air channel converting means.

Moreover, the rest of the configuration is formed in a similar or identical manner to that of Embodiment 1 above.

In Embodiment 7, ventilating channels that are constituted by the ventilating grooves 50 and the concentrated winding coils 34 extend radially so as to extend to the auxiliary ventilating grooves 53 from radially inside. Thus, cooling air that is blown out from the cooling fans 25 flows radially outward, not only between the coil ends 34c of the concentrated winding coils 34, but also through the ventilating channels that are constituted by the ventilating grooves 50 and the concentrated winding coils 34, and reaches the auxiliary ventilating grooves 53. The cooling airflow that has flowed to the auxiliary ventilating grooves 53 is deflected axially outward by the second curved surfaces 53a, and be made to flow axially outward. Contact area between the coil ends 34c of the concentrated winding coils 34 and the cooling air is thereby increased, enabling the cooling performance of the concentrated winding coils 34 to be increased.

Moreover, in Embodiment 7 above, the cross-sectional shape of the second curved surfaces is a circular arc that has a central angle of 90 degrees, but the cross-sectional shape of the second curved surfaces is not limited to a circular arc that is 90 degrees, provided that it is a curve that can convert the cooling airflow that has flowed radially outward into an axial flow.

Moreover, in each of the above embodiments, cases in which cooling fans are disposed on two axial end portions of a rotor core have been explained, but a cooling fan may be disposed only on one axial end portion of the rotor core, and if the cooling fan is disposed only on the second axial end portion of the rotor core, for example, the air channel dividing plate that is disposed at the first axial end of the stator is omitted.

In each of the above embodiments, a 20-pole, 24-slot inner-rotor three-phase motor has been explained, but the number of poles and the number of slots in the rotary electric machine are not limited thereto.

In each of the above embodiments, a rotor is used in which permanent magnets are embedded in a rotor core, but similar or identical effects can also be achieved if a rotor is used in which permanent magnets are fixed to an outer circumferential surface of a rotor core.

The invention claimed is:

1. A rotary electric machine comprising:
 a housing including:
  a cylindrical member; and
  a first end plate that is disposed on a first axial end of said cylindrical member;
  a second end plate that is disposed on a second axial end of said cylindrical member;
 a rotor that includes a shaft of which two axial end portions are rotatably supported by said first end plate and said second end plate and an annular rotor core that is fitted over and is fixed to said shaft, said rotor being disposed inside said housing;
 a first cooling fan that includes blades and is disposed on a first axial end surface of said rotor core;
 a stator that includes:
  a stator core in which a plurality of teeth are each disposed so as to project radially inward from an inner circumferential wall surface of an annular core back, and are arranged in a row at a predetermined pitch circumferentially; and
  a stator coil that is constituted by concentrated winding coils that are wound onto each of said teeth, said stator being held by said cylindrical member so as to surround said rotor; and
 an air channel dividing plate that is disposed between an axial direction of said first end plate and coil ends at a first axial end side of said concentrated winding coils that are positioned radially outside said first cooling fan,
 an inner circumferential edge of said air channel dividing plate being radially separated from said shaft, and
 a cyclic pathway being formed in which cooling air is blown out from said first cooling fan, flows radially outward along a first axial end surface of said stator core between axial positions of said first axial end surface of said stator core and said air channel dividing plate, and then flows radially inward between axial positions of said air channel dividing plate and said first end plate, and returns to said first cooling fan on an inner circumferential side of said air channel dividing plate,
 wherein said rotary electric machine comprises a first air channel converting member that is disposed on said first end surface of said stator core so as to be positioned radially outside a circumferential gap between coil ends at a first axial end side of circumferentially adjacent concentrated winding coils, and that converts said cooling air that is blown out from said first cooling fan and has flowed radially outward along said first axial end surface of said stator core from said circumferential gap between said coil ends at said first axial end side of said circumferentially adjacent concentrated winding coils into an axial flow toward said first end plate, wherein said first air channel converting member has a thickness that varies along a direction parallel to an axis of the shaft and tapers off towards an end portion of said first channel converting member.

2. The rotary electric machine according to claim 1, further comprising a second air channel converting member that is disposed between said air channel dividing plate and said first end plate so as to face said first air channel converting member axially so as to convert into a radially inward flow said axial flow of said cooling air that is converted into said axial flow toward said first end plate by said first air channel converting member.

3. The rotary electric machine according to claim 1, further comprising insulating members that include:
 a drum portion; and
 a pair of flange portions that are formed integrally on two longitudinal ends of said drum portion;
 wherein each of said concentrated winding coils is produced by disposing said insulating members on two end surfaces of said stator core such that said drum portions are positioned on end surfaces of said tooth such that longitudinal directions thereof are oriented radially, and said pair of flange portions are positioned on end surfaces of said core back and inner circumferential edges of end surfaces of said tooth, and by winding a conductor wire around said tooth and said drum portions that are disposed on said two ends of said tooth;
 wherein said first air channel converting members are formed on two circumferential side portions of said flange portions of said insulating members that are positioned on said end surfaces of said core back;
 wherein a third air channel converting member is formed on a portion of said insulating members that faces radially inward from a circumferentially central portion of said flange portions that are positioned on said end surfaces of said core back;

wherein a ventilating groove is formed on a surface of said drum portion so as to extend from a radially inner side to said third air channel converting member; and wherein said cooling air that is blown out from said first cooling fan and has flowed radially outward between said ventilating grooves and said concentrated winding coils is converted to an axial flow toward said first end plate by said third air channel converting member.

4. The rotary electric machine according to claim 1, further comprising a connecting board that is manufactured into a ring-shaped flat plate, that is disposed axially outside said concentrated winding coils of said stator, and that connects said concentrated winding coils to configure a predetermined alternating-current winding, said connecting board also functioning as said air channel dividing plate.

5. The rotary electric machine according to claim 1, wherein a second cooling fan is disposed on a second axial end of said rotor, and the number of blades that are formed on said first cooling fan and said second cooling fan is different.

6. The rotary electric machine according to claim 1, wherein said blades extend radially outward from said rotor core such that outer circumferential edges thereof are positioned in radial positions between an inner circumferential edge of said stator core and inner circumferential edges of said coil ends at said first axial end side of said concentrated winding coils.

7. The rotary electric machine according to claim 1, wherein:
said rotor includes:
  a spider that includes:
    a tubular rotor core holding portion; and
    a spider-flange portion that extends radially outward from a first axial end of said rotor core holding portion;
  a rotor core that is mounted so as to be fitted over and fixed to said rotor core holding portion;
  permanent magnets that are housed in magnet insertion apertures that are each formed so as to pass through an outer circumferential portion of said rotor core so as to have aperture directions in an axial direction so as to be disposed at a predetermined pitch circumferentially;
  a rotor core bracing plate that is mounted and fixed to a second axial end of said rotor core holding portion so as to restrict axial movement of said rotor core together with said spider-flange portion; and
  said shaft which is mounted so as to be fitted inside and fixed to said rotor core holding portion; and
said spider-flange portion includes said blades to constitute said first cooling fan.

8. The rotary electric machine according to claim 7, wherein said blades are formed on a surface of said spider-flange portion that faces said rotor core.

9. The rotary electric machine according to claim 7, wherein the number of said blades is not a multiple of a divisor of the number of said permanent magnets and the number of slots in said stator core.

10. The rotary electric machine according to claim 7, wherein said blades are formed on a surface of said spider-flange portion on an opposite side from said rotor core.

11. The rotary electric machine according to claim 10, wherein said blades are formed such that a width thereof widens gradually from an outer circumferential end to an inner circumferential end.

* * * * *